US006993505B1

(12) United States Patent
Katz et al.

(10) Patent No.: US 6,993,505 B1
(45) Date of Patent: Jan. 31, 2006

(54) METHOD AND SYSTEM FOR PERFORMING CRA, HMDA, AND FAIR LENDING ANALYSIS AND REPORTING FOR A FINANCIAL INSTITUTION

(75) Inventors: Charles B. Katz, New York, NY (US); William T. Caldon, Floral Park, NY (US); Daniel Mahoney, Rahway, NJ (US); Carl Stone, Sea Cliff, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 08/914,789

(22) Filed: Aug. 20, 1997

(51) Int. Cl.
*G06F 17/60* (2006.01)
(52) U.S. Cl. .......................... 705/38; 705/44; 715/522; 715/523
(58) Field of Classification Search .................. 705/38, 705/36, 44, 35
See application file for complete search history.

(56) References Cited

U.S. PATENT DOCUMENTS

| 4,989,141 | A |   | 1/1991  | Lyons et al. .................. 705/36 |
| 5,262,941 | A |   | 11/1993 | Saladin et al. ................ 705/38 |
| 5,274,547 | A | * | 12/1993 | Zoffel et al. .................. 705/38 |
| 5,813,009 | A | * | 9/1998  | Johnson et al. ............. 707/100 |
| 6,259,456 | B1 | * | 7/2001 | Gibson ....................... 345/433 |

OTHER PUBLICATIONS

Prince, Cheryl J.; "Compliance Vendors do Battle in Newly Competitive Market", Bank Systems and Technology, v32 n2 pp. 22-24, Feb. 1995.*
"CFI Proservices Announces a New Software Product that Simplifies Fair Lending", PR Newswire; Jun. 1, 1994.*
Marshall, William T.; "Examinations at a Distance. (Off-Site Bank Evaluations)", America's Community Banker, v6, n7, p16(6), Jul., 1997.*
Gamble, Richard H.; "Compliance Help", Independent Banker, v47, n7, p67-68, Jul. 1997.*
New Software Brings HMDA Data to Desktop, Regulatory Compliance Watch, v4, n48, p4, Dec. 19, 1994.*

(Continued)

*Primary Examiner*—Hani M. Kazimi
*Assistant Examiner*—Stefano Karmis
(74) *Attorney, Agent, or Firm*—George T. Marcou; Kilpatrick Stockton LLP (57) ABSTRACT

The present invention discloses a method and system for collecting, standardizing, and analyzing lending data from all the offices of a financial institution, including information on small business, home equity, motor vehicle, credit card, mortgage, other secured and unsecured consumer products for commercial, community development, not-for-profit, and consortium customers. The invention enables data collection and analysis in a timely fashion such that interim reports may be prepared so that changes in lending practices can be implemented to assist with assuring compliance with the fair lending acts. A central repository is linked to all of the offices of the financial institution, and data mapping features are used to provide standardized reporting so that all data will be reported in a standardized form. The system processes, collects and standardizes information on new loans, renewals, credit line increases and application decisions for all of the business units within a financial institution. The present invention permits internal management reporting for review of performances against the CRA and HMDA plans. It also permits preparation of the reports for filing with the federal regulatory agencies, such as OCC, FRS and OTS. Furthermore, the present invention permits rapid response to federal regulatory agency audits of reported CRA and HMDA information.

9 Claims, 10 Drawing Sheets

OTHER PUBLICATIONS

Henry, Shannon; "CRA Software Wins Raves for Speed, Flexibility. (PCI Services CRA Wiz Community Reinvestment Act Compliance Software)", American Banker, v160, n119, p8, Jul. 22, 1995.*

Schulz, Matt; "Cheaper Access on Internet Seen Forcing Innovation by Compliance Vendors", American Banker, v161, n123, p12, Jun. 27, 1996.*

Schulz, Matt; "N.Y. Banking Department Acts to Standardize CRA Regulations, Examinations", American Banker, v161, n89, p8, May 9, 1996.*

"Fair Lending: New CRA Rules Will Transfer Most of Compliance Burden to Regulators", BNA Banking Daily, Apr. 28, 1995.*

"CRA Specialist", Credit Risk Management Report, v5, n6, Mar. 13, 1995.*

"CFT ProServices Exec Follows Impact of Regulations on Bank", Business Journal-Portland, v10, n49, p13, Jan. 28, 1994.*

"CFI ProServices announces a new software product that simplifies fair lending." PR Newswire, Jun. 1, 1994 (retrieved from DIALOG file 148, accession No. 07284075).*

Prince, Cheryl J. "Compliance vendors do battle in newly competitive market." Bank Systems & Technology, vol. 32, No. 2, pp. 22-24, Feb. 1995 (retrieved from DIALOG file 15, acc. No. 00980989).*

"CFI ProServices exec follows impact of regulations on banks." Business Journal—Portland, vol. 10, No. 49, Jan. 28, 1994 (retrieved from DIALOG file 148, accession No. 07178386).*

Whybrow, Martin. "Warehousing benefits." Banking Technology, vol. 12, No. 4, p. 16, May 1995 (retrieved from DIALOG, file 268, acc. No. 00267825).*

"Wessex's Pro/Files(TM) makes desktop mapping easy." Bank Marketing, vol. 26, No. 3, p. 49, Mar. 1994 (retrieved from DIALOG, file 15, accession No. 00843604).*

Swift, Clinton R. "Integrated systems." The Magazine of Bank Management, Mar. 1990, p. 26.*

Zimmerman, Kim Ann. "Banks zoom in on customers." United States Banker, Apr. 1991, National Edition, p. 31.*

Broome, J. Tol, Jr. "Being systematic about CRA can boost examiner ratings." Bank Management, vol. 68, No. 8, pp. 42045, Aug. 1992 (retrieved from DIALOG file 15, accession No. 00631524).*

Sraeel, Holly. "Community banks play it fair." Bank Systems & Technology, vol. 31, No. 10, pp. 54-60, Oct. 1994 (retrieved from DIALOG file 15, accession No. 00930960).*

Radigan, Joseph. "The nuts and bolts of toeing the line." United States Banker, vol. 104, No. 10, pp. 48-49, Oct. 1994 (retrieved from DIALOG file 15, accession No. 00930469).*

"New software brings HMDA data to desktop." Regulatory Compliance Watch, vol. 4, No. 48, p. 4, Dec. 1994 (retrieved from DIALOG file 625, accession No. 0077349).*

Avery, Robert B. et al. "Cross-lender variation in home mortgage lending." Economic Review, vol. 30, No. 4, pp. 15-29 (retrieved from DIALOG file 15, accession No. 00975175).*

Marrinan, Michele. "CRA reform to spur tech investments." Banks Systems & Technology, vol. 32, No. 7, pp. 22-24, Jul. 1995 (retrieved from DIALOG file 15, acc. No. 01068514).*

Bafefoot, Jo Ann S. "Will PCs revolutionize compliance? Compliance and technology: first ot two parts." ABA Banking Journal, vol. 88, No. 2, pp. 20-26, Feb. 1996 (retrieved from DIALOG file 15, acc. No. 01168030).*

Theberath, M., Integrating HMDA Data into Fair Lending and CRA Planning, Mar. 1995, Hoosier Banker, vol. 79, Iss. 3, pp. 16-22.*

Joseph Radigan. The Nuts and Bolts of Toeing the Line. The United States Banker. vol. 104 n10. pp. 48-49. Oct. 1994.*

* cited by examiner

| FIELD REQUIRED | PRIVATE BANK LOANS FIELD | NOTES |
|---|---|---|
| ACCOUNT INFORMATION | | |
| Customer Type | WS-PBLOAN-BUSINESS-IND | If equal to "C", the account is corporate; if "I", the account belongs to an individual. If field is blank, default is "I" (Individual) |
| Business Entity | WS-PBLOAN-BUSINESS-Entity<br>WS-PBLOAN-ACCT-FSB-BUSINESS | WS-PBLOAN-BUSINESS-ENTITY contains one of the following values:<br>   PBUS   Private Bank U.S.<br>   PBWH   Private Bank Western Hemisphere<br>   PBFSB  Private Bank FSB<br>All PBUS and PBWH accounts are credited to the Private Bank and assigned to FIMP Code 001. If value of this field is equal to PBFSB, the value in WS-PBLOAN-ACCT-FSB-BUSINESS is used to determine the breakout of these accounts by business; this field contains the valid FIMP codes for the FSB businesses. |
| Branch Code | WS-PBLOAN-EXP-CODE | This field contains the Private Bank expense code. |
| Purchased / Originated ID | Not applicable. | |

*FIG. 4A1*

| FIELD REQUIRED | PRIVATE BANK LOANS FIELD | NOTES |
|---|---|---|
| GEOCODED INFORMATION | | |
| State | | To be provided by CRA process. |
| County | | |
| Census Tract | | |
| MSA | | |

*FIG. 4A3*

| PBLN PRODUCT CODE | DESCRIPTION | CUSTOMER TYPE | SECURED CODE | CRA PRODUCT CODE |
|---|---|---|---|---|
| CMT | Commitment | Retail | Secured | 07 - Other Secured Consumer Loans |
| | | | Not Secured | 08 - Other Unsecured Consumer Loans |
| LNS | Full earning loan | Retail | Secured | 07 - Other Secured Consumer Loans |
| | | | Not Secured | 08 - Other Unsecured Consumer Loans |
| CMT | Commitment | B & P | Secured | 03 - Other Sec Lines of Credit for Purposes of Small Business |
| | | | Not Secured | 01 - Small Business |
| LNS | Full earning loan | B & P | Secured | 03 - Other Sec Lines of Credit for Purposes of Small Business |
| | | | Not Secured | 01 - Small Business |

*FIG. 4B*

| FIELD REQUIRED | PRIVATE BANK LOANS FIELD | NOTES |
|---|---|---|
| Loan Number | WS-PBLOAN-ACCT-NUMBER or WS-PBLOAN-ACCT-CRA-COMTMNT-NO | See processing notes below. |
| Open Data | WS-PBLOAN-CRA-ORIGINATED | Contains the date the commitment or loan was approved. |
| Original Amount Loan / Line | WS-PBLOAN-ACCT-CRA-CA-AMOUNT | Contains the amount of the loan or commitment when the loan / commitment was first approved. |
| Renewal Date | WS-PBLOAN-ACCT-CRA-RENEWAL-DATE | Only used if WS-PBLOAN-BUSINESS-IND is equal to 'C', this field contains the date a corporate commitment was last renewed. |
| Renewal Amount | WS-PBLOAN-ACCT-CRA-RENEWAL-AMOUNT | Only used if WS-PBLOAN-BUSINESS-IND is equal to 'C', this field contains the amount of the last corporate commitment renewal. |
| Line Increase Date | WS-PBLOAN-ACCT-INCREASE-DATE | This field contains the date of the last line increase for this account / commitment. Reset to zero at month end. |
| Line Increase Amount | WS-PBLOAN-ACCT-INCREASE-AMOUNT | This field contains the total of line increases in the current month for this loan / commitment. Individual line increases within the current month are not broken out. |
| Product Code | WS-PBLOAN-PROD-CODE WS-PBLOAN-BUSINESS-IND WS-PBLOAN-ACCT-CRA-SECURED-CODE | See processing notes below. CRA only processes records where the Product Code field is equal to 'CMT' (Commitment) or 'LNS' (Full Earning Loan). |
| Sub Product Code | Not applicable. | |
| Customer's Address | If populated: WS-PBLOAN-ACCT-CRA-ADDRESS (occurs 3) or WS-PBLOAN-ACCT-ADDRESS1 - WS-PBLOAN-ACCT-ADDRESS4 | If populated, the first field (three occurrences) contains the address of the property used to secure this loan; otherwise, use the existing fields for the customer's address. The new address field contains the address used to perform a credit check; existing fields contain the customer's address. |
| City | WS-PBLOAN-ACCT-CRA-CITY or WS-PBLOAN-ACCT-CITY | Note: Where City and State are not populated, the last address line is checked for the presence of this information. |
| State | WS-PBLOAN-ACCT-CRA-STATE or WS-PBLOAN-ACCT-STATE | |
| Zip | WS-PBLOAN-ACCT-CRA-ZIP or WS-PBLOAN-ACCT-ZIP | The existing feed does not contain Zip + 4 information. Zip + 4 information provided in new field if entered by operator. |
| Current Year / Applicant Income | WS-PBLOAN-ACCT-CRA-SALES-REVENUE or WS-PBLOAN-ACCT-CRA-ANNUAL-INCOME | If the value of WS-PBLOAN-CRA-BUSINESS-IND = 'C', use WS-PBLOAN-ACCT-CRA-SALES-REVENUE; if the value is 'I' or blank, use WS-PBLOAN-ACCT-CRA-ANNUAL-INCOME. |

*FIG. 4A2*

| RUN DATE: MM/DD/YY | | U.S./EUROPE MARKETING SALES SUPPORT | | | | REPORT NO: SBRBXXX-R01 | |
| --- | --- | --- | --- | --- | --- | --- | --- |
| RUN TIME: HH:MM:SS 80a | | SECTOR CIDBASE UPDATE | | | | PAGE NO: 1 | |
| | | CRA/HMDA CONTROL REPORT BY SOURCE PRODUCT | | | | | |
| 80b SOURCE: PRIVATE BANK LOANS 80c | | 80d | 80e | 80f | 80g | 80h | 80i |
| | | | CRA | | HMDA | | |
| PRODUCT DTL KEY | DESCRIPTION | LOANS | LOAN $ | LOANS | LOAN $ | TOTAL LOANS | TOTAL LOAN $ |
| 001PBLN0000100 | MONTHLY PAYMENT BUSINESS LOAN | 9 | 9,999,999.99 | 9 | 9,999,999.99 | 18 | 19,999,999.98 |
| 001PBLN0000101 | MONTHLY PAYMENT BUSINESS LOAN | 9 | 9,999,999.99 | 9 | 9,999,999.99 | 18 | 19,999,999.98 |
| 001PBLN0000102 | MONTHLY PAYMENT BUSINESS LOAN | 9 | 9,999,999.99 | 99 | 9,999,999.99 | 108 | 19,999,999.98 |
| 001PBLN0000103 | MONTHLY PAYMENT BUSINESS LOAN | 99 | 99,999,999.99 | 9 | 99,999,999.99 | 108 | 199,999,999.98 |
| 001PBLN0000104 | MONTHLY PAYMENT BUSINESS LOAN | 9 | 9,999,999.99 | 9 | 9,999,999.99 | 18 | 19,999,999.98 |
| 80k | BUSINESS SUB-TOTAL | 99 | 99,999,999.99 | 99 | 99,999,999.99 | 198 | 199,999,999.98 |
| GRAND TOTAL | 80j | 234 | 240,000,000.04 | 234 | 240,000,000.04 | 468 | 480,000,000.08 |

FIG. 4C

| FIELD NAME | | DESCRIPTION |
| --- | --- | --- |
| DATA SOURCE | 80a | Identifies the System that supplied the source file (e.g., Private Bank Loans, ACAPS). |
| Product Detail Key | 80b | This field can be broken down as follows:<br>Positions 1-3 - Contains the FIMP code of the business.<br>Positions 4-7 - Code that identifies the source of these records.<br>Positions 8-14 - Product Code as received on the source file.<br>There is one line entry for every Business / Source / Product Code combination. |
| Description | 80c | Free form description of the product. |
| CRA Loans | 80d | Total number of extracted CRA loans for this product. |
| CRA Loan $ | 80e | Total CRA loan amount for this product. |
| HMDA Loans | 80f | Total number of extracted HMDA loans for this product. |
| HMDA Loan $ | 80g | Total HMDA loan amount for this product. |
| Total Loans | 80h | Total number of loans extracted this period for this product. The total number of CRA + HMDA loans (Field 4 + Field 6) may be greater than the total number of loans in this field, as some accounts may be eligible for both CRA and HMDA. |
| Total Loan $ | 80i | Total loan amount processed for this product. This amount will always equal the total CRA + HMDA loan amounts. |
| Business Sub-Total | 80j | Provides breakdown of CRA / HMDA by business. |
| Grand Total | 80k | CRA / HMDA grand totals for the entire source file. |

FIG. 4D

| RUN DATE : MM / DD / YY | | | U.S. / EUROPE MARKETING SALES SUPPORT | | REPORT NO : SBRBXXX-R02 |
|---|---|---|---|---|---|
| RUN TIME : HH : MM : SS *85a* | | | SECTOR CIDBASE UPDATE | | PAGE NO : 1 |
| *85c* | | | CRA / HMDA CONTROL REPORT BY CRA / HMDA PRODUCT | | |
| SOURCE: | PRIVATE BANK LOANS | *85e* | | *85f* | *85g* |
| BUS | C/H | PROD | DESCRIPTION | LOANS | LOAN $ |
| 001 | C | 1 | SMALL BUSINESS | 9 | 9,999,999.99 |
| 001 *85b* | C *85d* | 3 | OTHER SECURED LINES FOR SMALL BUS | 9 | 9,999,999.99 |
| | | | CRA SUB-TOTAL *85h* | 9 | 9,999,999.99 |
| 001 | H | 1 | CONVENTIONAL | 9 | 9,999,999.99 |
| 001 | H | 2 | FHA - INSURED | 99 | 99,999,999.99 |
| 001 | H | 4 | MULTI-FAMILY DWELLING *85i* | 9 | 9,999,999.99 |
| | | | HMDA SUB-TOTAL *85j* | 99 | 9,999,999.99 |
| | | | BUSINESS SUB-TOTAL *85k* | 243 | 159,999,999.93 |
| | | | GRAND TOTAL | 185 | 159,999,999.93 |

FIG. 4E

| FIELD NAME | | DESCRIPTION |
|---|---|---|
| Source | 85a | Identifies the System that supplied the source file (e.g., Private Bank Loans, ACAPS). |
| Bus(iness) | 85b | Contains the business' FIMP code. |
| C/H (CRA/HMDA) | 85c | CRA/HMDA indicator (C = CRA, H = HMDA) |
| Product | 85d | Contains the government CRA or HMDA product code. |
| Description | 85e | Contains a description of the CRA / HMDA product code. |
| Loans | 85f | Number of loans extracted this processing period for this CRA / HMDA product code. |
| Loan $ | 85g | Total loan amount extracted this month for this CRA / HMDA product code. |
| CRS Sub-Total | 85h | Total CRA number and loan amounts extracted this month for this business. |
| HMDA Sub-Total | 85i | Total HMDA number and loan amounts extracted this month for this business. |
| Business Sub-Total | 85j | Total number and loan amounts extracted this month for this business. |
| Grand Total | 85k | Total number and loan amounts extracted this month from this source file for all businesses. |

FIG. 4F

```
RUN DATE: MM / DD / YY           U.S. / EUROPE MARKETING SALES SUPPORT          REPORT NO : SBRBXXX-R03
RUN TIME: HH: MM: SS   90a              SECTOR CIDBASE UPDATE                   PAGE NO :           1
                                  CRA / HMDA SOURCE FILE RECONCILIATION REPORT

SOURCE:  PRIVATE BANK LOANS      90b
   BUSINESS:  001 - NEW YORK BANK

90c  →  TOTAL LOANS ON FILE :    99,999     LOAN $ :      999,999,999.99
              90d  →  TOTAL LOANS EXTRACTED :   9,999     LOAN $ :        9,999,999.99
              90e  →  CRA TOTALS
                         ORIGINATIONS :           999     LOAN $ :          999,999.99
                            RENEWALS :            999     LOAN $ :          999,999.99
                       LINE INCREASES :            99     LOAN $ :          999,999.99
                         MAINTENANCE :              9     LOAN $ :           99,999.99
              90f  →  HMDA TOTALS
                            PIPELINE :              9     LOAN $ :           99,999.99
                            APPROVED :              9     LOAN $ :           99,999.99
                        NOT APPROVED :              9     LOAN $ :           99,999.99
                              DENIED :              9     LOAN $ :           99,999.99
                           WITHDRAWN :              9     LOAN $ :           99,999.99
                         FILE CLOSED :              9     LOAN $ :           99,999.99
                           PURCHASED :              9     LOAN $ :           99,999.99
                         MAINTENANCE :              9     LOAN $ :           99,999.99
```

*FIG. 4G*

| FIELD NAME | | DESCRIPTION |
|---|---|---|
| Source | 90a | Identifies the System that supplied the source file (e.g., Private Bank Loans, ACAPS). |
| Bus(iness) | 90b | Contains the business' FIMP code. |
| Total Loans on File | 90c | Details the total number of loans / loan amounts on the source file for this business. |
| Total Loans Extracted | 90d | The total number of loans / amounts extracted from the source file for the current processing period. |
| CRA Totals | 90e | The total number of CRA loans / amounts extracted from this file for the current processing period. Further breakdown is provided for loan Originations, Renewals, Line Increases, and Maintenance records. |
| HMDA Totals | 90f | The total number of HMDA loans / amounts extracted from this file for the current processing period. Further breakdown is provided for each HMDA Action Code and Maintenance records. |

*FIG. 4H*

| RUN DATE: MM/DD/YY | U.S./EUROPE MARKETING SALES SUPPORT | | REPORT NO: SBRBXXX-R03 |
|---|---|---|---|
| RUN TIME: HH:MM:SS | SECTOR CIDBASE UPDATE | | PAGE NO: 1 |
| | CRA/HMDA SOURCE FILE RECONCILIATION REPORT | | |

SOURCE: PRIVATE BANK LOANS

GRAND TOTALS - ALL BUSINESSES

| | | | |
|---|---|---|---|
| TOTAL LOANS ON FILE: | 99,999 | LOAN $: | 999,999,999.99 |
| TOTAL LOANS EXTRACTED: | 9,999 | LOAN $: | 9,999,999.99 |
| CRA TOTALS | | | |
| ORIGINATIONS: | 999 | LOAN $: | 999,999.99 |
| RENEWALS: | 999 | LOAN $: | 999,999.99 |
| LINE INCREASES: | 99 | LOAN $: | 999,999.99 |
| MAINTENANCE: | 9 | LOAN $: | 99,999.99 |
| HMDA TOTALS | | | |
| PIPELINE: | 9 | LOAN $: | 99,999.99 |
| APPROVED: | 9 | LOAN $: | 99,999.99 |
| NOT APPROVED: | 9 | LOAN $: | 99,999.99 |
| DENIED: | 9 | LOAN $: | 99,999.99 |
| WITHDRAWN: | 9 | LOAN $: | 99,999.99 |
| FILE CLOSED: | 9 | LOAN $: | 99,999.99 |
| PURCHASED: | 9 | LOAN $: | 99,999.99 |
| MAINTENANCE: | 9 | LOAN $: | 99,999.99 |

*FIG. 4I*

| RUN DATE: MM/DD/YY | U.S./EUROPE MARKETING SALES SUPPORT | | | | | | REPORT NO: SBRB611-R01 | |
|---|---|---|---|---|---|---|---|---|
| RUN TIME: HH:MM:SS | SECTOR CIDBASE UPDATE | | | | | | PAGE NO: 1 | |
| | PRODUCT DETAIL FINANCIAL CONTROL BALANCE REPORT | | | | | | | |

95a PRODUCT: 999BDD  TYPE/STATUS: 95b  95c  95d  95e  95f  95g  95h  95i

| PRODUCT DTL KEY | DESCRIPTION | CATEGORY | SERVICE | PTYPE | STYPE | BANK | TOTAL RECORDS | TOTAL BALANCES |
|---|---|---|---|---|---|---|---|---|
| 001PBLN0000100 | MONTHLY PAYMENT BUSINESS LOAN | 1 | ILS | MPB | REG | ## | 99 | 9,999,999.99 |
| 014PBLN0000100 | MONTHLY PAYMENT BUSINESS LOAN | 1 | ILS | MPB | REG | ## | 99 | 9,999,999.99 |
| 011PBLN0000100 | MONTHLY PAYMENT BUSINESS LOAN | 1 | ILS | MPB | REG | ## | 99 | 9,999,999.99 |
| 013PBLN0000100 | MONTHLY PAYMENT BUSINESS LOAN | 1 | ILS | MPB | REG | ## | 999 | 99,999,999.99 |
| 003PBLN0000100 | MONTHLY PAYMENT BUSINESS LOAN | 1 | ILS | MPB | REG | ## | 99 | 9,999,999.99 |
| 95j P-TYPE SUB TOTAL | | | | MPB | | | 1,395 | 139,999,999.95 |
| 95m SERVICE SUB TOTAL 95k | | | ILS | | | | 1,395 | 139,999,999.95 |
| CATEGORY SUB TOTAL | | 1 | | | | | 1,395 | 139,999,999.95 |
| GRAND TOTAL | | | | | | | 1,395 | 139,999,999.95 |

*FIG. 4J*

| FIELD NAME | | DESCRIPTION |
|---|---|---|
| Product Detail Key | 95a | This field can be broken down as follows:<br>　　Positions 1 - 3 - Contains the business' FIMP Code.<br>　　Positions 4 - 7 - Code that identifies the source of these records.<br>　　Positions 8 - 14 - Product Code as received from the business.<br>There is one line entry for every Business / Source / Product Code combination. |
| Description | 95b | Free form description of the product. |
| Category | 95c | Contains the CRA Product Code field |
| Service | 95d | Contains standard Sector CIDBase marketing values. Can be used to further analyze / group product types. |
| PType | 95e | |
| SType | 95f | |
| Rank | 95g | |
| Total Records | 95h | Total number of records extracted for each Product Detail Key combination. |
| Total Balances | 95i | Total balance for each Product Detail Key combination. |
| Service Sub Total | 95j | Total number of Accounts / Balances extracted for each marketing Service Category identified by this job. |
| Category Sub Total | 95k | Total number of Accounts / Balances processed for each CRA Product Code. |
| Grand Total | 95m | Grand Total of all accounts extracted this month. |

METHOD AND SYSTEM FOR PERFORMING CRA, HMDA, AND FAIR LENDING ANALYSIS AND REPORTING FOR A FINANCIAL INSTITUTION

FIELD OF THE INVENTION

The present invention relates generally to a system and method for collecting, reporting, and other loan analysis information management for a large financial institution, and in particular, to a system that assists a financial institution with extracting relevant data from all of its legal entities and storing this data in a common repository in a normalized fashion such that the institution may prepare reports to assist with or fulfill compliance with federal law, such as the Community Reinvestment Act (CRA) and Home Mortgage Disclosure Act (HMDA).

BACKGROUND OF THE INVENTION

Recently, Congress enacted the CRA and HMDA to ensure fairness in lending by financial institutions. CRA regulations requiring the reporting of small business lending for legal entities in the United States went into effect Jan. 1, 1996, for data collection. Additional regulations went into effect on Jan. 1, 1997, for initial reporting and on Mar. 1, 1997, for data submission reporting. The requirements apply to small business and farm loans, community development loan data, and data on lending by consortium or a third party. In addition, some financial institutions may elect to report consumer loans and affiliations. The HMDA requires similar reporting regarding home mortgages. Accordingly, all U.S. legal entities processing qualifying loan originations and purchases, credit line increases, annual renewals, or maintenance for these entities are required to begin methodically reporting qualified data to a collection unit as of Jan. 1, 1996. In addition, the following products will be processed as well: all liability products (consumer and Business & Professional (B&P)) that are Federal Deposit Insurance Corporation (FDIC) insured, Community Development loans, affiliate lending, and service transactions.

The CRA and HMDA require detailed reporting regarding the lending to individuals based on their geography and financial status. While compliance with these acts is relatively easy for a small bank with a single branch, it is extremely complex for a large bank with many branches and single function offices dispersed throughout the country. It is even more difficult for a global financial institution with offices located all over the world.

As noted above, specific reporting requirements under the CRA/HMDA include: 1) Small Business and Farm Loans; 2) Community development loan data; 3) Data on Lending by consortium or a third party; and 4) Home Mortgage loans. Small Business and Farm Loans are those with gross annual revenues of $1 million or less based on revenues that the bank used in making the credit decision. For a banking institution, these loans can include the following: Loans Originated or Purchased; Business Ready Credit and Checking Plus loans; Tailored Lines and Loans; Monthly Payment Business Loans; and Mortgages.

In addition to required reporting, optional data collection and maintenance methods are allowable under the CRA/HMDA. These data collection and maintenance options may be categorized into five broad areas: 1) consumer loans; 2) other loan data; 3) data on affiliate lending; 4) assessment area data; and 5) CRA disclosure statement.

For consumer loans, a financial institution may choose to collect data originated or purchased for consideration under the lending test. The institution's reporting include one or more of the following categories: 1) motor vehicle (including indirect business); 2) other secured (installment); 3) credit card (affiliate lending) business and consumer; 4) home equity; and 5) unsecured. If a portion of a credit line (e.g., home improvement loan) is reported under HMDA and another portion meets the definition of a small business loan, the full amount of the line of credit should be reported as a small business loan. The agencies will also consider as a home mortgage loan the portion of the credit line that is reported under the HMDA.

For data on affiliate lending, the bank may elect to report for consideration loans by any of its affiliates, such as bankcards, leasing, franchises, student loans, and mortgages. Data must be maintained separately by each category and include the following for each loan: 1) unique alpha/numeric loan number; 2) the loan location; and 3) the gross annual income of the borrower/co-borrower that the bank considered in making the credit decision. For some loan data the bank must provide information concerning its lending performance, including additional loan distribution data.

For assessment area data, the bank must collect and report all data to the Federal Reserve Board starting Mar. 1, 1997, for each assessment area showing the geographies within the areas. For the CRA Disclosure Statement, the Federal Reserve Board will generate annually a CRA Disclosure Statement for each bank on a state-by-state basis. An assessment area consists generally of one or more Metropolitan Statistical Areas (MSAs) or one or more contiguous political sub-divisions such as counties, cities, or towns, and includes the geography in which the bank has its main office, branches, deposit taking Automatic Teller Machines (ATMs), as well as the surrounding geographics in which the bank has originated or purchased a substantial portion of its loans, including home mortgage loans, small business and farm loans, and any other loans the bank chooses (e.g., consumer loans on which the bank elects to have its performance assessed).

Under federal law, each bank's assessment area must consist only of whole geographies and may not reflect illegal discrimination. In addition, the assessment may not arbitrarily exclude low or moderate income geographics or extend substantially beyond a MSA boundary, or beyond a state boundary, unless the assessment area is located in a multi-state MSA.

In general, large financial institutions have a need for automated systems and methods for centralizing all CRA/HMDA reporting. This need has not been met by the current art because such financial institutions typically have disparate businesses, affiliates, products, customers and systems, and these hurdles have prevented development of single CRA/HMDA repositories and encompassing processes to handle internal Management Information System (MIS) and federal filing needs. Such system needs include not only management of the complex organizational and product sets, but also the extremely large volume of loan records these types of financial institutions must report.

A problem with existing art is that, for most banks, there is no central unit responsible for the tracking, reporting and analyzing of data for CRA and HMDA. However, for some banks, some data pertaining to CRA and HMDA may nevertheless be tracked based other criteria, such as for preparation of reports to marketplace managers and board of directors.

Another problem with existing art is that a number of factors may complicate identification of reporting data. For example, there may be multiple databases currently in use to report under the CRA and HMDA, even for a typical banking institution for which data is maintained and organized by computer databases. These databases may be used independently for tracking data, and in some cases there may be no reconcilement to ensure data integrity. Data may be difficult to obtain in a timely fashion, and, depending on the source, may be somewhat in question.

Another problem is that single purpose offices, such as those located in remote locations for processing credit cards, may further complicate compliance for large financial institutions. All data for each of these offices may be collected by hand and then reported to the bank regulators separately. Since each office may prepare its report without the benefit of data from the other offices, compliance may only be analyzed on a per office basis and at the end of a year, at which time no action can be taken to ensure compliance if the financial institution is out of compliance.

SUMMARY OF THE INVENTION

It is an object of the present invention to solve the problems of existing art by providing a method and system for automatically assisting a large financial institution with its reporting and other loan analysis information management, including those that occur under fair lending requirements of the CRA and HMDA. Specifically, the present invention is directed to a method and system that assists a financial institution with extracting relevant data from all of its legal entities and storing this data in a common repository in a normalized fashion such that the institution may prepare reports to assist with or fulfill compliance with federal law, such as federal lending laws, including the CRA and HMDA.

It is a further object of the present invention to prepare these reports on a periodic basis such as monthly and annually.

It is a further object of the present invention to store the reformatted and normalized data in a central repository. It is a further object of the present invention to integrate new data with existing data in the repository.

It is a further object of the present invention to provide workstations for outputting compliance reports and analysis using the data, wherein these workstations may provide fair lending and other data on either an individual unit basis or for the whole financial institution.

Additional objects, advantages, and novel features of the invention will be set forth in the following description and will become apparent to those skilled in the art upon reading this description or practicing the invention.

The present invention meets these objectives by providing a system and method for assembling a comprehensive repository from diverse sources and retrieving, in a meaningful way, information from the central repository that is developed. The system and method of the present invention are primarily, but not exclusively useful for supporting large-scale federal data reporting requirements, especially for large financial institutions and internal MIS requirements and reviews.

In a broad sense, the system of the present invention links all of the relevant components of a large financial institution. The direct linkage to these components, which include the branch offices, other access channels, such as telephones, and other elements of the institution (e.g., internal databases), is an important aspect of the invention because it allows direct communication of current data. The present invention thus provides a method and system for collecting and analyzing lending data from all of the components in a timely fashion, such that interim reports may be made available so that changes in lending practices can be implemented to assist with ensuring that the financial institution remains in compliance with the fair lending acts and other requirements. The present invention also serves other purposes. For example, it helps the financial institution avoid the restrictions that could be imposed for non-compliance and establishes the institution as a community leader and model for other financial institutions.

In addition to assisting an institution with compliance needs, such as the requirements of CRA/HMDA regulations, the present invention assists institutions with gaining advantage over their competition by such techniques as analyzing lending practices to predict compliance or non-compliance trends sufficiently early in the lending year to allow changes in lending practices to be implemented in response to identified trends. The present invention also provides internal management with reporting for review of performance against the CRA and HMDA plans or other targets. Furthermore, the present invention permits rapid response to internal or federal regulatory agency audits of reported CRA and HMDA information or other collected or reported data.

The present invention is able to handle all the internal MIS and federal filing needs of a very large financial institution with disparate businesses, affiliates, products, customers and systems by virtue of its ability to manage, manipulate, and extract information from these sources. Via this system and method, the present invention not only manages the complex organizational and product sets, but also handles the extremely large volume of loan records a financial institution is required or chooses to report. The present invention enables the financial institution to properly record, geo-code and report all CRA and HMDA eligible mandatory and optional data in correct and expected formats for purposes of submitting necessary reports to regulatory agencies to satisfy the regulation.

In an embodiment of the present invention, the method and system includes a central repository, a compliance fulfillment center having a plurality of user workstations, and a variety of sources of data, connected via electronic or other links to the various offices, branches, and other components of a financial institution. In addition to obtaining the data via links with these sources, the present invention utilizes data mapping features to provide standardized reporting so that all data may be reported in a standard form. Pertinent data from the database links, also known as feeds, are processed as follows: the data is extracted for a processing period, for example, monthly; the data is normalized to a standard format; and the data is geo-coded to obtain FIPS state, FIPS county, census tracts and MSAs.

The method and system of the present invention also provides year-to-date data analysis for further processing. In this analysis, the data is geo-coded and regulatory edit checked; the data is analyzed by organization, product, geography, peer-to-peer, and other factors; and presentation grade mapping is prepared. In addition, internal Management Information System (MIS) reports are prepared; and regulatory filings are developed.

In an embodiment of the present invention, the central repository collects at a single location the data from, for example, the various branches and other elements of a financial institution. In an embodiment of the present invention, the central repository is housed in a mainframe computer, and the data analysis elements are personal computer (PC) based. Master files created by the system are available for ad hoc MIS on the mainframe using data analysis tools.

BRIEF DESCRIPTION OF THE DRAWINGS

FIGS. 4A1–3 detail the data elements from the Private Bank Loans CRA file required to fulfill CRA reporting according to the present invention for an example lending institution.

FIG. 4B depicts the Private Bank Loan/CRA product mapping used in an embodiment of the present invention for an example lending institution.

FIG. 4C shows the CRA/HMDA Control Report by Source Product for Private Bank Loans, which provides a listing of all product codes extracted from the source file for an example lending institution.

FIG. 4D depicts the field descriptions used in the report shown in FIG. 4C.

FIG. 4E shows the CRA/HMDA Control Report by CRA/HMDA Product for Private Bank Loans, which provides the totals of extracted loans in the current processing period by government CRA/HMDA product codes for an example lending institution.

FIG. 4F depicts the field descriptions used in the report shown in FIG. 4E.

FIG. 4G shows the CRA/HMDA Source File Reconciliation Report for Private Bank Loans for an individual business, which provides an overall picture of an individual business' CRA/HMDA performance by CRA/HMDA Action type for an example lending institution.

FIG. 4H depicts the field descriptions used in the report shown in FIG. 4G.

FIG. 4I provides a sample of the CRA/HMDA Source File Reconciliation Report for Private Bank Loans for all businesses, which is a Grand Totals summary report used for an example lending institution.

FIG. 4J shows the Product Detail Financial Control Balance Report for Private Bank Loans, which provides a listing of all source product codes extracted from a source file during the current processing period for an example lending institution.

DETAILED DESCRIPTION

The present invention links the relevant components of a large financial institution as part of a system and method for assembling a comprehensive repository from diverse sources and facilitate retrieving, in a meaningful way, information from the central repository that is developed. The system and method of the present invention are primarily, but not exclusively useful for supporting large-scale federal data reporting requirements, especially for large financial institutions. The present invention further provides a method and system for collecting and analyzing lending data from all the offices of a financial institution in a timely fashion, such that interim reports may be made available so that changes in lending practices can be implemented to guarantee that the financial institution remains in compliance with the fair lending acts. The method and system of the present invention also serve other purposes. For example, the method and system help the financial institution to avoid the restrictions that could be imposed for non-compliance, and to establish itself as a community leader and model for other financial institutions.

In addition to assisting an institution with compliance needs, such as the requirements of CRA/HMDA regulations, the present invention assists institutions with gaining advantage over their competition by such techniques as analyzing lending practices to predict trends early in the lending year. Such predictions allow changes in lending practices to be implemented in response to these identified trends.

The present invention provides internal management with reporting for review of performance against the CRA and HMDA plans or other targets. Furthermore, the present invention permits rapid response to internal or federal regulatory agency audits of reported CRA and HMDA information or other collected or reported data.

The present invention is able to handle the internal MIS and federal filing needs of a very large financial institution with disparate businesses, affiliates, products, customers and systems by virtue of use of a centralized repository. The present invention not only manages the complex organizational and product sets, but also handles the extremely large volume of loan records a financial institution is required or chooses to report. The present invention enables the financial institution to centrally record, geo-code and report all CRA and HMDA eligible mandatory and optional data in correct and expected formats for purposes of submitting necessary reports to regulatory agencies to satisfy the regulation.

The system of the present invention preferably includes a central repository, a fulfillment center having a plurality of user workstations, and a variety of sources of data, connected via electronic or other links to the various offices, branches, and other components of a financial institution. In addition to obtaining the data via links with these sources, the present invention utilizes data mapping features to provide standardized reporting so that all data may be reported in a standard form. Pertinent data from the database links, also known as feeds, are processed as follows: the data is extracted for a processing period, for example, monthly; the data is normalized to a standard format; and the data is geo-coded (using a computer program such as Harte-Hanks software, a commercially-available system produced by Harte-Hanks Data Technologies of Ellerica, New Hampshire) to obtain FIPS state, FIPS county, census tracts and MSAs.

The method and system of the present invention also provides year-to-date data analysis for further processing. In this analysis, the data is geo-coded and regulatory edit checked; the data is analyzed by organization, product, geography, peer-to-peer, and other factors; and presentation grade mapping is prepared. In addition, internal Management Information System (MIS) reports are prepared; and regulatory filings are developed.

In an embodiment of the present invention, the central repository collects at a single location the data from, for example, the various branches and other elements of a financial institution. In an embodiment of the present invention, the central repository is housed in a mainframe computer, and the data analysis elements are personal computer (PC) based. The central repository could also include a server on a network or a PC. The data analysis elements could also be mainframe or server based. Master files created by the system are available for ad hoc MIS on the mainframe using data analysis tools such as SAS, a commercially-available software product produced by SAS Institute, Inc. of Cary, N.C.

The present invention includes a process and resulting repository that will collect and standardize information on new loans, renewals, credit line increases and application decisions for all U.S. based businesses within the organization. This repository contains normalized information on small business, home equity, motor vehicle, credit card, mortgage, other secured and unsecured consumer products for commercial, community development, consumer, not-for-profit and consortium customers.

The present invention facilitates the establishment of a central CRA/HMDA unit within a bank. The establishment of this unit assists internal management reporting for review of performance against CRA/HMDA plans, filing of CRA/HMDA information to Federal regulatory agencies (OCC, FRS, OTS), and responding to federal regulatory agency audits of reported CRA/HMDA information.

References will now be made in detail to an embodiment of the present invention, an example of which is illustrated in the accompanying drawings.

Figure 1:
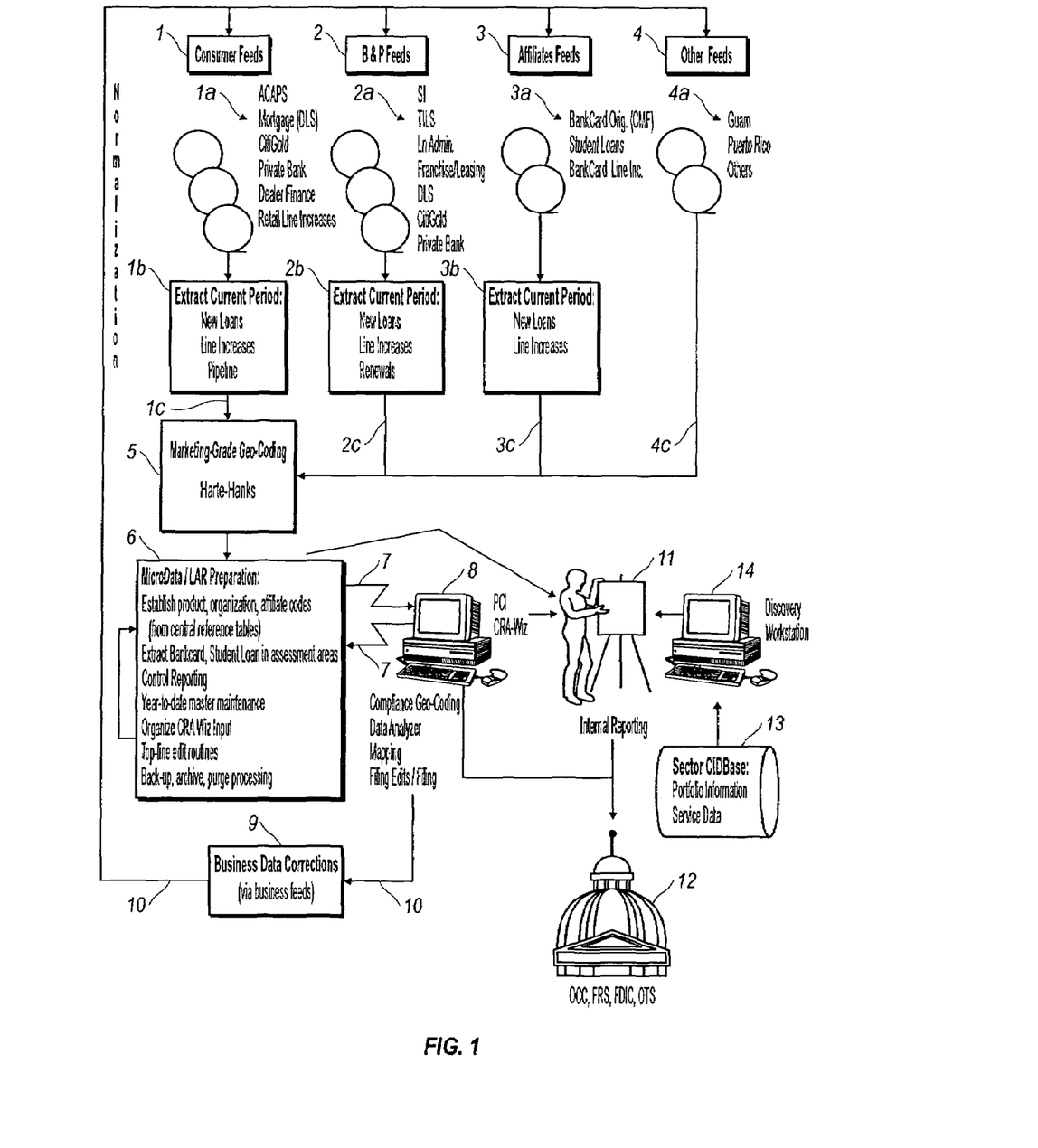
FIG. 1 depicts the high level design block diagram of an embodiment of the present invention.

An overall view of the present invention is shown in FIG. 1. Files from the systems supporting the back offices 1–4 of the financial institution are examined and the relevant data 1a–4a is extracted 1b–3b and delivered 1c–4c to the system and reformatted to be compatible with other data.

Thus, data from a variety of sources 1–4 are fed into a computer system that automatically extracts certain types of information, such as data on new loans and credit line increases. The data, which are reformatted, parsed, and then geo-coded using a system such as the Harte-Hanks method 5, is then fed into the MicroData/LAR Preparation 6 portion of the system, where several functions are performed on the data. In an embodiment of the present invention, the MicroData/LAR Preparation 6 includes bankcard data extraction, student loan data extraction for desired assessment areas, control reporting performance, year-to-date master maintenance, top line edit routines performance, backup, archiving and purge processing, and establishment of product, organization, and affiliate codes from the central reference tables.

The data is then fed 7 to the workstations 8 for analysis and report generation. Business data corrections 9 are fed back to the systems supporting the branch systems and then reenter as mainframe transactions. In an embodiment of the present invention, the data is transmitted 7 to a workstation, such as the PCI CRA-WIZ, a commercially available system produced by PCI CRA-WIZ of Bouton, Massachusetts, for analysis and reporting 6 to facilitate compliance with the CRA and HMDA, including reporting to the appropriate regulatory agency. The repository can then be accessed 7 via workstations 8, such as PCs, and reports relevant to the CRA and HMDA are displayed to users to indicate the financial institution's performance relative to these statutes. These data may be used for internal reporting 11, and preparing reports for state, federal, or other authorities 12. As noted, reporting interface application components include sequential files to support ad-hoc mainframe reporting, such as SAS, and a repository to support other queries, such as generic host or PC-based queries. In addition, portfolio and service information from a separate repository 13 may be reviewed for internal reporting 11 using workstations 14. Compilation of each of these results assists with other analyses of the financial institution, including ongoing performance evaluation and response to audits.

Figure 2:
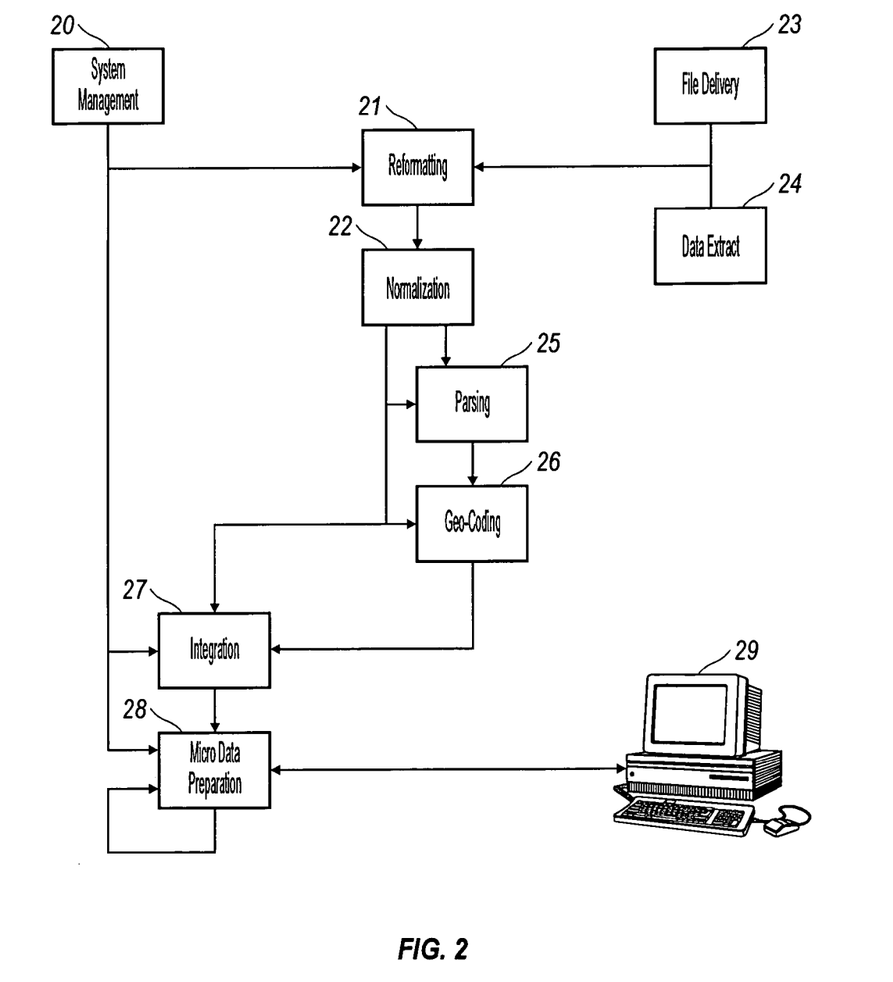
FIG. 2 depicts a block diagram of the system operating according to an embodiment of the present invention.

Referring to the high-level block diagram shown in FIG. 2, the method and system of an embodiment of the present invention includes several main elements—System Management 20, Reformatting 21, Normalization 22, File Delivery 23, Data Extraction 24, Parsing 25, Geo-Coding 26, Integration 27, and Micro Data Preparation 28, all of which reside on the mainframe. All of these processes involve communication with and control by a workstation 29, such as PCs.

The operation of an embodiment of the present invention may be more easily explained using an example of reporting by a large banking institution. This application refers to such reporting by using data for Citibank. At Citibank, some of the legal entities that may report CRA and HMDA data include regional marketplaces, mortgages, credit cards, economic development, leasing, and other lending entities.

At Citibank, for required reporting for small business and farm loans under the CRA/HMDA, the system utilizes the following data and methods: 1) a unique alpha/numeric symbol to identify loans; 2) loan amount at time of origination; "Loan Amount" is defined as the size of the line of credit or loan commitment when the line/loan was granted; "Loan Amount" for loan participation or syndication is the entire amount of the credit originated by the lender; the amount of the line increase is also considered the "Loan Amount" and a new origination; 3) loan location; 4) geo-coding of all business addresses; and 5) reporting by aggregate number and loan amounts and for each geography in which the bank has originated small business or farm loan.

For reporting for community development loan data and data on lending by a consortium or a third party, the system as applied to Citibank aggregates the number and amounts for each geography in which the bank originated or purchased a community development loan. For reporting for home mortgage loans, the Citibank version of the system requires information to support reporting by the location of each home loan application, origination, or purchase outside the MSAs in which the bank has a home or branch office.

Each of the various components of the present invention are described in detail below, both in a general sense and as applied to the specific example of Citibank reporting. The Citibank example is intended to demonstrate the versatility of the system, as applied to a large banking institution with disparate branches and other reporting elements. The example is not intended to limit the application of the system to a particular banking institution or institutions nor to indicate necessary or typical reporting or data collection.

System Management

As shown in FIG. 2, in an embodiment of the present invention, the System Management 20 portion of the system serves several functions, including: system audit and control; table maintenance; control of the assessment area and product normalization; and control file processing. In an embodiment of the present invention, the System Management operates on a mainframe, where it creates and maintains two tables that are maintained off-line and backed-up before each monthly cycle begins. The first table, which is referred to as the System Control, contains the procedure prerequisites and dependencies. The second table normalizes products through source product code conversion. A System Control program, which drives all functions, is executed as the first and last step in all jobs.

In addition to maintaining the above tables, in an embodiment of the present invention the System Management module utilizes throughout the system a control file, such as a Virtual System Access Method (VSAM) file, with a key of Date & Process information. This control file controls a task referred to Process Date Maintenance; this task increments the process-date by one month at the beginning of each monthly cycle. This control file also serves to validate procedures, using Verification of Prerequisite Procedures; this file assures that no procedure is allowed to continue unless all prerequisite procedures have been successfully completed for the current month. The Prerequisite Procedures are defined in a Control Table. The control file also conducts Step-to-Step Reconciliation and Period to Period Reconciliation. In this task, the file records counts and balance totals gathered from Prerequisite Procedures are compared to corresponding information in the current procedure; the file then records counts and balance totals gathered from previous executions of the current procedure to compare the current execution. Another function of the control file is Run-Time Recording: the file records start and end dates and times for analysis of potential schedule changes to improve throughput/performance.

Data Extraction

Figure 3:
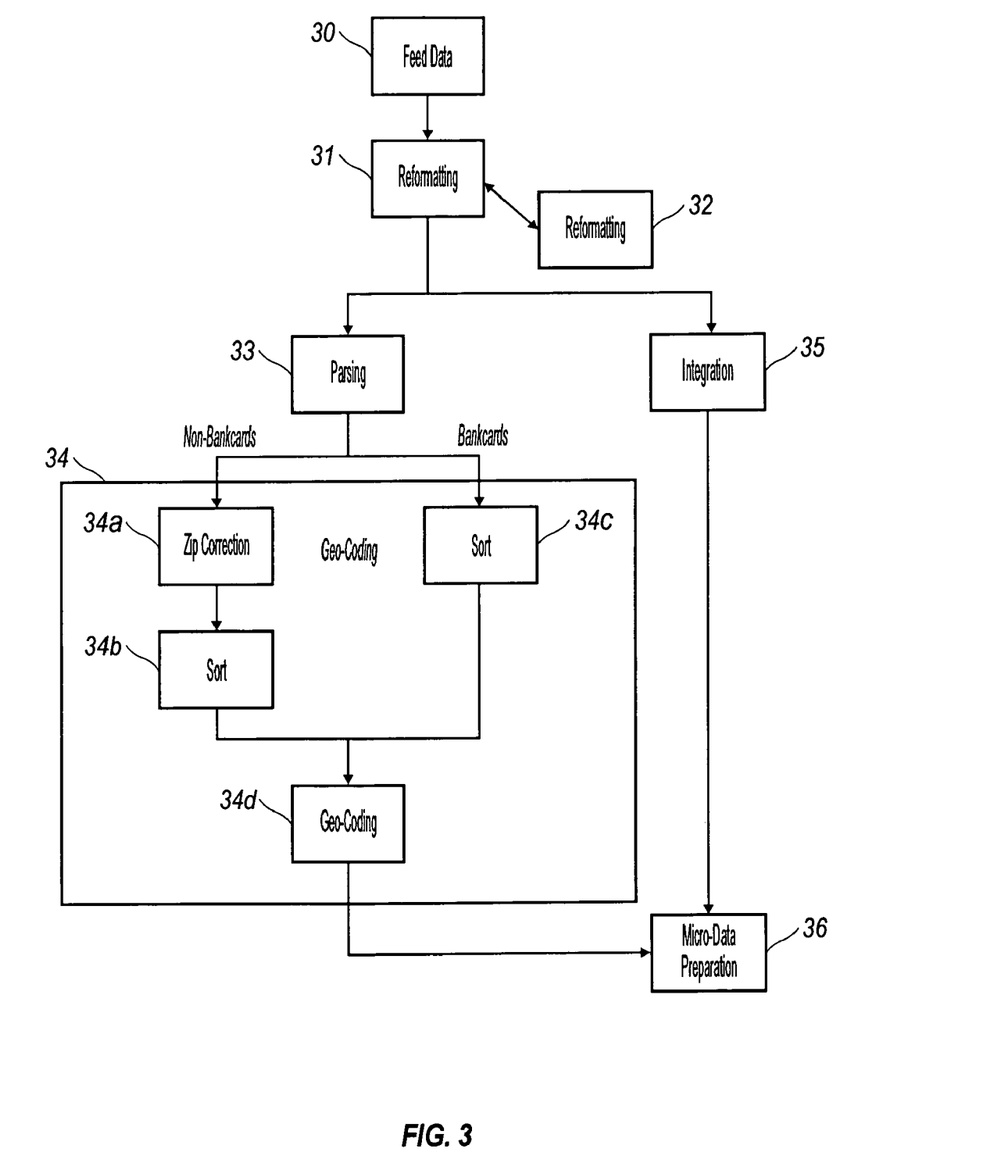
FIG. 3 depicts schematically the process for reformatting, normalizing, parsing, geo-coding, and integrating source data used for each input source.

In an embodiment of the present invention, data extraction involves obtaining information relevant to the CRA and HMDA statutes from the various products and services provided by the financial institution. In FIG. 3, Data Extraction comprises an element of Feed Data 30. For the Citibank example, these sources include bankcards and student loans.

For Citibank, an existing system, known as Sector CID-Base currently receives files from these systems. This system is described in patent application Ser. No. 08/702,039 Melchione, SALES PROCESS SUPPORT SYSTEM AND METHOD, filed Aug. 23, 1996, which is hereby incorporated by reference. This system is modified to create feed files for the present invention. These programs use the Error Report and Control Totals Module to provide a status of the extraction process.

File Delivery

File delivery includes delivery of the data to the system from the various elements of the financial institution. These data may be from a variety of sources and may use differing operating systems; the data sources can include relational databases. As shown in FIG. 3, data from each of these systems is collected monthly and input to the Reformatting 31 and Normalization 32 elements of the present invention; thus, in FIG. 3, file delivery comprises an aspect of Feed Data 30.

File Delivery Data Example Using Citibank's Private Bank Loans

To further detail how an embodiment of the present invention applies the system and method to each component of a sophisticated banking institution, this section details information and processes relating to one of the file delivery elements discussed above for Citibank. In order for the data from each of these feeds to be processed, detailed coding and information analysis must be tailored to the type of feed data that the source provides. The following example details data for the Private Bank Loans feed for the Citibank example.

The Private Bank Loans feed contains origination, renewal, and line increase information for both consumer and Business and Professional (B&P) accounts. The CRA process selects CRA eligible accounts from the Private Bank Loans file based on the following criteria: 1) for new accounts, the value in the opening date field of the repository for the account must fall within the processing period; 2) for renewal loans, the value in the renewal date field must fall within the processing period; and 3) for line increases, the value in the line increase date field must fall within the processing period. All accounts supplied on this feed are identified as Private Bank; a further breakdown by business is available for Private Bank Federal Savings Bank (FSB) accounts.

Private Bank Loans produces a new monthly file for the CRA process. A Sector CIDBase program at Citibank receives an extract from the Private Bank Hogan Loans system; this feed includes CRA related fields. Private Bank produces one file for use by Sector CIDBase and a second file that contains additional loan records for Private Bank Western Hemisphere and Private Bank FSB. Commitment records are also included.

For CRA purposes, the present invention only processes those accounts that are either new bookings or were renewed or received line increases during the current processing period. While the Private Bank Loans file provides information down to the draw level, Sales Support reports CRA information at the note level. Individual draw records are bypassed by the CRA process.

The Private Bank Loans CRA file provides information on letters of credit, full earning loans, non-accrual loans, reserve loans, and suspense loans. At Citibank, Sales Support extracts records for Full Earning Loans (Product Code 'LNS') and Commitments (Product Code 'CMT')—all other records are bypassed. Sales Support also assigns CRA product codes based on the Compliance approved Private Bank Loans. Private Bank notifies Sales Support when new product codes are created so that this mapping can be updated. Sales Support builds CRA product codes using the source field supplied by Private Bank Loans; additional qualifiers are added to the CRA field to segregate Commercial/Retail and Secured/Unsecured accounts.

Data Mapping

The chart shown in FIG. 4A1–3 details the data elements from the Private Bank Loans CRA file required to fulfill CRA reporting. Accounts are identified as CRA eligible if one of three dates (Opening, Line Increase, Renewal) falls within the current processing period.

Processing Notes (referenced in FIGS. 4A1–3)

Loan Number

The WS-PBLOAN-ACCT-NUMBER field contains a fifteen digit loan number that can be tied back to the Private Bank Hogan origination system. Commitment records contain zero values in this field. Standalone loans can be further identified by zero values in the WS-PBLOAN-ACCT-CRA-COMTMNT-NO field. Individual notes are bypassed in favor of their commitment records. Sales Support populates the loan number field in the following manner.

Standalone Loans

Identify standalone loans by non-zero values in WS-PBLOAN-ACCT-NUMBER and zero values in WS-PBLOAN-ACCT-CRA-COMTMNT-NO (if non-zero, bypass record, as this record is part of a commitment).

Commitments

Identify Commitments by zero values in WS-PBLOAN-ACCT-NUMBER. The commitment number can be found in WS-PBLOAN-ACCT-CRA-COMTMNT-NO.

Product Code

Sales Support extracts records where WS-PBLOAN-PROD-CODE is equal to the designation 'LNS' or 'CMT.' All other records are bypassed. Sales Support builds a seven character product code field, using WS-PBLOAN-PROD-CODE as the initial source of information; this four character code is moved to the last four bytes of the CRA product code field (right-justified, zero filled). The first byte of this field contains a customer type indicator (R=Retail, C=B & P); the second byte indicates if the loan is secured (S=Secured, U=Unsecured); a zero is moved to the third byte. For example, the CRA product code for a Retail, Secured Full Earning loan would be: RS00LNS.

R Retail customer

S Secured loan

0 Zero moved to third byte

0LNS 'LNS' Private Bank product code right-justified, zero filled.

For Commitment records, Sales Support uses 'CMT' as the product code. This allows Sales Support to both identify CRA records that are at the Commitment level and to allow for specific commitments that may have more than one product type at the draw level.

Product Mapping The Private Bank Loan/CRA product mapping is shown in FIG. 4B.

Balancing Procedures

Sales Support produces the following reports to facilitate the monthly CRA/HMDA reconciliation process. These reports enable Compliance to perform analysis for each source file supplied for CRA/HMDA.

Report # 1—Business CRA/HMDA Control Totals by Source Product

The report shown in FIG. 4C provides a listing of all source product codes extracted from the source file for a business. A breakdown of CRA and HMDA totals is available, as well as grand totals by product code and business. This report enables Compliance to monitor the performance of a specific product for CRA and HMDA by business.

Field Descriptions

FIG. 4D provides the field descriptions for the report shown in FIG. 4C.

Report # 2—Business Control Totals by CRA/HMDA Product Code

The report shown in FIG. 4E provides totals for extracted loans in the current processing period by government CRA/HMDA product codes. This report provides Compliance with an overall picture of the business' CRA/HMDA performance within a specific source file.

Field Descriptions (Report 2)

FIG. 4F provides the field descriptions for the report shown in FIG. 4E.

Report # 3—CRA/HMDA Monthly Extracted Record Analysis The report shown in FIG. 4G provides an overall picture of the business' CRA/HMDA performance by CRA/HMDA Action type. This report enable Compliance to monitor the total number of loans extracted from the current source file, in comparison to the file's entire portfolio. In addition, this report details the number of originations, renewals, etc., extracted for a business during the current processing period.

Individual Bank Totals

FIG. 4G includes individual bank totals.

Field Descriptions (Report 3)

FIG. 4H provides the field descriptions for the report shown in FIG. 4G.

Grand Totals

The report in FIG. 4I provides a sample of the Grand Totals summary for Report #3; this summary enables Compliance to analyze the performance of an entire source file.

Report # 4—Source Product Code Reconciliation

The report shown in FIG. 4J provides a listing of all source product codes extracted from a source file during the current processing period. For Citibank, standard Sector CIDBase marketing codes are included to assist in product analysis. This report highlights any product codes not identified on the source file. These "Unknown" codes are researched and resolved before data is loaded to the CRA repository.

Field Descriptions (Report 4)

Figure 4K:
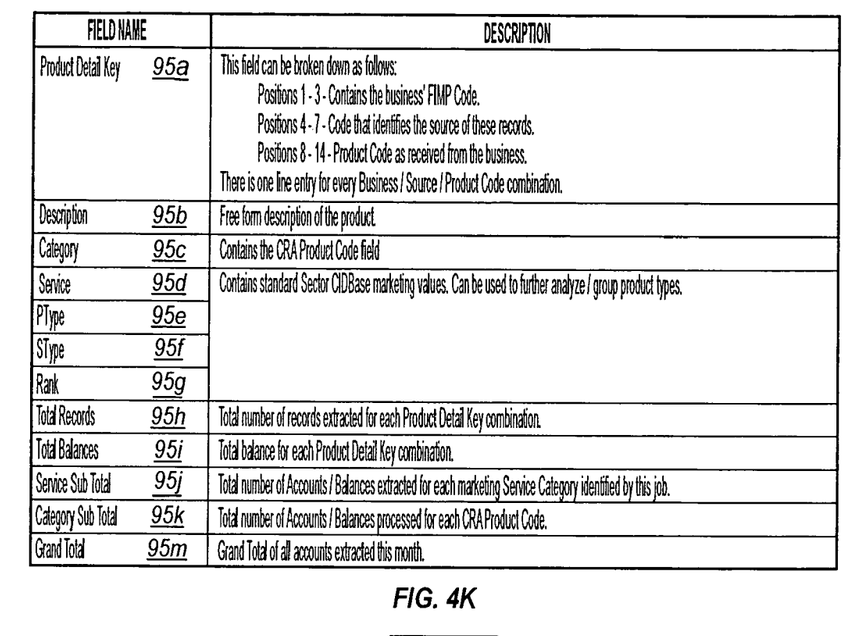
FIG. 4K depicts the field descriptions used in the report shown in FIG. 4J.

FIG. 4K provides the field descriptions for the report shown in FIG. 4J.

Reformatting and Normalization

In an embodiment of the present invention, the Reformatting and Normalization functions of the system are closely related. Reformatting includes custom data extraction and conversion, reportability determination for both HMDA and CRA, and Loan Type differentiation. Loan Type differentiation includes new loans, line increases, and renewals. Normalization includes identification of initial/default settings, parsing and geo-coding transactions, and product normalization.

Referring to FIG. 3, which provides a schematic representation of the various computerized programs comprising the tasks carried out in an embodiment of the present invention, feed data 30 is reformatted 31 and normalized 32 using reformat programs, such as Job Control Language (JCL) programs, tailored for each input source. These programs use Error Report and Control Totals Modules to provide a status of the reformatting process and call a Normalization Module to perform functions that are generic to all feeds, such as output record initialization, product code normalization, and the generation of transactions that drive the Parsing 33 and subsequent Geo-Coding 34 processes. Thus, dedicated reformatting programs each are tailored to the input files the system must process. Some data, which do not require Parsing 33 and Geo-Coding 34, serve as direct input to the Integration 35 program.

In an embodiment of the present invention, a single JCL procedure is executed by all the reformat jobs. This procedure utilizes a symbolic parameter that allows unique identification of files from each feed. A separate reformat program is specifically tailored to each feed based on the input file processed.

Additional programs may be used by the system to carry out the above described steps. For example, the following program constitutes a separate element used by multiple steps for the Citibank example system. The reformat and integration procedures each call a CRA and HMDA Control Report Module. This module accumulates totals at a variety of levels and provides a series of comprehensive reports to be used for audit trail and system validation purposes.

Parsing

In an embodiment of the present invention, parsing includes Address Parsing (such as the Harte-Hanks system) and Geo-code Transactions. Referring to FIG. 3, Reformatted 31 and Normalized 32 data are fed, as necessary based on their format, into the Parser Driver 33. In the Citibank example, the parser program feeds the demographic information into the Sector CIDBase Parser Driver which in turn calls the Harte-Hanks engine and the Sector CIDBase Parser Post Processor. By using the existing Parser Driver, the present invention can utilize the existing normalization logic currently in use by Sector CIDBase. The Parser Driver uses the Error Report and Control Totals Module to provide a status of the parsing process.

Geo-Coding

In an embodiment of the present invention, Geo-Coding includes ZIP Correction and Geo-coding. Referring to FIG. 3, Geodata transactions from the Parsing process 33 are fed into Geo-Coding procedures depending on whether they comprise bankcard or non-bankcard services. Non-bankcard data are processed first by a ZIP Correction program 34a, and then sorted by a Sort program 34b. Bankcard data are simply sorted by a Sort program 34c. All sorted data are then processed by a Geo-Coding 34d program.

For the Citibank example, the Zip Correction program is performed by a Sector CIDBase procedure; the sort program for non-bankcards is performed by another Sector CIDBase procedure; the sort program for bankcards is performed by another Sector CIDBase procedure; and the geo-coding program is performed by another Sector CIDBase procedure. At Citibank, one JCL procedure is used for this job. This procedure concatenates all the geodata transactions from all the Parsing jobs and executes the procedures above. The resulting single Geo-Code file is read into all the integration jobs. The existing copybooks Geodata and Geo-coded Geodata that define the input and output from this job are used as the output definition by the Parsing program and as the input definition by the Integration program.

At Citibank, the Asset/Liability Zip-Correction process utilized may not be used for all non-bankcard feeds. The quality of data from each feed must be evaluated individually. While the above describes the Geo-Coding process as a single job, the job is sometimes run on two occasions: first with data from as many reformats that have run by a certain date, and second, when all reformats have completed with output from all remaining reformats. This improves the overall performance of the system by allowing it to get an early start on Geo-Coding at a time when the system would otherwise be idle.

Integration

In an embodiment of the present invention, integration includes geodata merge, Product Normalization correction, and sort output. Referring to FIG. 3, Integration 35 takes the output from the intermediate procedure, Geo-Coding 34, and matches it to Reformat 31 file information. If the information obtained from the intermediate procedure is considered valid (i.e., there was no change to the "sectional zip"—the first three digits of the zip code), then the data is added to the Reformat 31 information to create a master file.

At Citibank, integration is achieved using a single program. In addition to merging the information from the two inputs, the Product Code Normalization is repeated to effect any adjustments made to the PRODNORM table that may have resulted from reviewing the output from the Reformat steps. The program uses an Error Report and Control Totals Module to provide a status of the integration process. One JCL procedure developed for this process executes all of the jobs that feed from the reformat process.

Micro-Data Preparation

In FIG. 2, Micro-Data Preparation 28 includes a selection of jobs to perform maintenance on the master files and to communicate from and to a desktop editing interface 29; in an embodiment of the present invention, these functions are performed by a commercially available system such as the PCI CRA-WIZ system. The tasks performed by this system include year-to-date master maintenance, product and affiliate code correction, control reporting, assessment state and county extract, desktop data extraction, government editing (e.g., Geo-codes), desktop feed-back merge, and HMDA/CRA Reporting.

The desktop editing interfaces include 1) monthly downloads, such as those containing new originations, new purchases, line increases, commercial loan renewals, and data corrections (affiliate lending information is extracted by assessment area); and 2) monthly uploads with compliance geo-coding results.

FIG. 3 depicts Micro-Data Preparation 36 which occurs via a program utilizing the results of the Integration 35 step. The specifics of Year-to-Date Master Maintenance are described further below.

Year-to-Date Master Maintenance

Year-to-Date Master Maintenance is a critical aspect of the present invention because this function assures that data is up-to-date and usable for all of the purposes described above. Assuring this data is up-to-date is a sophisticated process; in an embodiment of the present invention, the Year-to-Date Masters are built and maintained by accumulating monthly data. Further, there is a Year-to-Date Master for each data feed, and an aggregate Year-to-Date Master incorporating the data from all individual Year-to-Date Masters on one file.

Year-to-Date repository maintenance includes file arrival processing, data normalization, master file maintenance, product reference tables, organization reference tables, control reporting/audit trail, marketing geo-coding, back-up and recovery, and archive/purge process.

Figure 5:
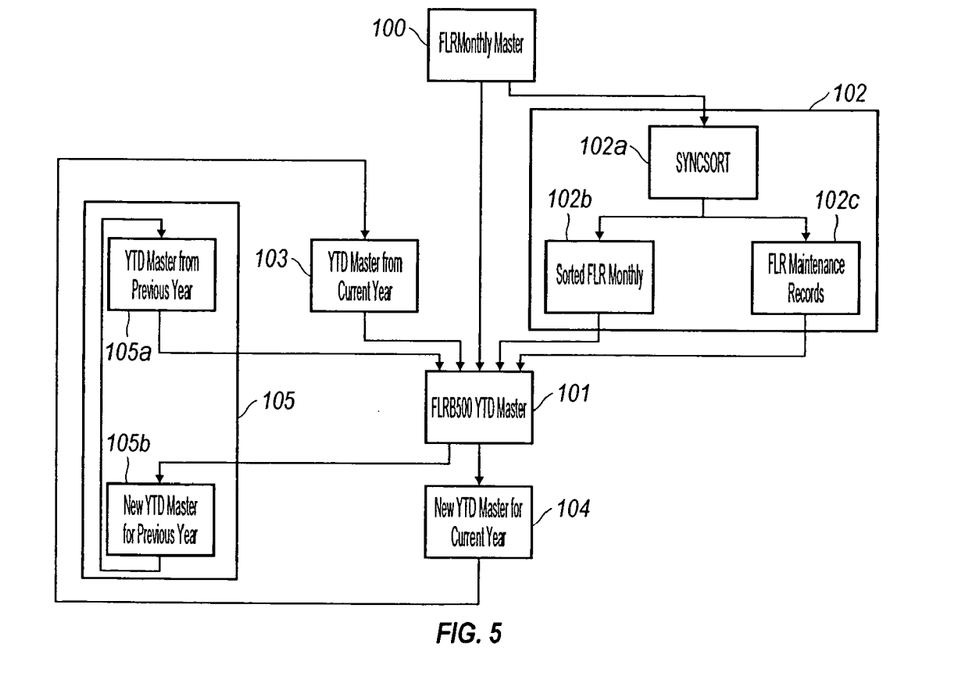
FIG. 5 depicts a block diagram of the Year-to-Date Master Maintenance component for an embodiment of the present invention.

An example from Citibank illustrates the potential complications of this process. FIG. 5 contains a block diagram of the Year-to-Date Master Maintenance procedure using the example of Citibank. At Citibank, the monthly data derives from Monthly Masters 100. Data that are already in sequence that do not contain maintenance records are fed directly into the program for Year-to-Date Master Maintenance 101. Data not in sequence and data containing maintenance records must enter a sorting procedure 102. Within the sorting procedure 102, the data first undergoes processing by a sort utility 102a, which sorts the masters and extracts maintenance records. Two sets of resulting data, the sorted FLR monthly master data 102b and the FLR maintenance records 102c, then separately serve as input to the program for Year-to-Date Master Maintenance 101. In addition to the monthly data from the Monthly Master 100 and the sorted 102b and maintenance data 102c, the Year-to-Date Master from the Current Year 103 serves as additional input to the update to the program for Year-to-Date Master Maintenance 101. The resulting data comprises the New Year-to-Date Master for the Current Year 103. At Citibank, in the months of January and February only, an additional processing step 105 is required to complete the Year-to-Date Master for the Previous Year. The existing data for the Year-to-Date Master from the Previous Year 105a is input into the program for Year-to-Date Master Maintenance 101, and a resultant New Year-to-Date Master for the Previous Year 105*b* is produced.

The present invention thus provides a method and system for collecting, reporting, and other loan analysis information management for a large financial institution. In particular, the system assists a financial institution with extracting relevant data from all of its legal entities and storing this data in a common repository in a normalized fashion such that the institution may prepare reports to assist with or fulfill compliance with federal law, such as the CRA and HMDA.

Detailed examples of the invention have now been described in fulfillment of the above-mentioned objects. Many other features and modifications will be apparent to those skilled in the art without departing from the spirit and scope of the invention. It is therefore intended that the invention be limited only as described in the appended claims.

What is claimed is:

1. A computer implemented method of storing and compiling data for analysis and reporting by a financial institution, said method comprising:
    extracting first data from a first source wherein the first data is configured in a first format;
    extracting second data from a second source wherein the second data is configured in a second format;
    reformatting the first data into third data wherein the third data is configured in a universal format;
    reformatting the second data into fourth data where the fourth data is configured in the universal format;
    normalizing the third and fourth data into normalized data;
    parsing a first portion of the normalized data so as to form parsed data;
    geo-coding a second portion of the normalized data and the parsed data so as to form geo-coded data;
    storing a third portion of the normalized data so as to form currently stored normalized data;
    storing the geo-coded data so as to form currently stored geo-coded data;
    determining if the currently stored normalized data differs from previously stored normalized data or if the currently stored geo-coded data differs from previously stored geo-coded data;
    integrating the currently stored normalized data with the previously stored normalized data so as to form integrated normalized data if the currently stored normalized data differs from the previously stored normalized data;
    integrating the currently stored geo-coded data with the previously stored geo-coded data so as to form integrated geo-coded data if the currently stored geo-coded data differs from the previously stored geo-coded data;
    preparing reports from either a combination of the integrated normalized data and integrated geo-coded data or from a combination of currently stored normalized data and currently stored geo-coded data.

2. The method according to claim 1, further comprising: transmitting said reports to at least one regulator of the financial institution.

3. The method according to claim 2, wherein the transmitting of said reports further comprises transmitting the reports on a predetermined date to the at least one regulator.

4. The method according to claim 2, wherein said regulators include the OCC, FRS, FDIC, and OTS.

5. The method according to claim 1, wherein the extracting is performed on a regular basis.

6. The method of claim 5, wherein the regular basis is a monthly basis.

7. The method of claim 1, wherein said plurality of sources includes branches of the financial institution.

8. The method according to claim 7, wherein said plurality of sources includes at least one from the group of bankcard processing centers, student loan processing centers, business loan processing centers, and US territorial locations of the financial institution.

9. The method according to claim 1, wherein said reports include predetermined reports.

* * * * *